United States Patent
Jidai et al.

(10) Patent No.: US 8,441,908 B2
(45) Date of Patent: May 14, 2013

(54) OPTICAL PICKUP DEVICE

(75) Inventors: Hidetaka Jidai, Sakai (JP); Iwao Usui, Kawachinagano (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 13/386,837

(22) PCT Filed: Jul. 6, 2010

(86) PCT No.: PCT/JP2010/061447
§ 371 (c)(1),
(2), (4) Date: Jan. 24, 2012

(87) PCT Pub. No.: WO2011/013484
PCT Pub. Date: Feb. 3, 2011

(65) Prior Publication Data
US 2012/0120785 A1    May 17, 2012

(30) Foreign Application Priority Data
Jul. 27, 2009    (JP) .................................. 2009-173856

(51) Int. Cl.
*G11B 7/00*    (2006.01)

(52) U.S. Cl.
USPC .............. 369/112.16; 369/44.23; 369/112.01; 369/112.05

(58) Field of Classification Search ............... 369/44.23, 369/112.01, 112.15, 112.16, 112.19, 112.23, 369/112.29
See application file for complete search history.

(56) References Cited

U.S. PATENT DOCUMENTS

| | | | | |
|---|---|---|---|---|
| 4,443,873 | A * | 4/1984 | Anthon ..................... | 369/112.29 |
| 5,307,335 | A * | 4/1994 | Komiya .................... | 369/112.19 |
| 6,717,729 | B2 * | 4/2004 | Goto et al. ............... | 359/485.02 |
| 2004/0174779 | A1 * | 9/2004 | Ajiki et al. ................ | 369/44.14 |
| 2006/0039265 | A1 * | 2/2006 | Lee .......................... | 369/112.01 |
| 2007/0053271 | A1 * | 3/2007 | Ryu et al. ................. | 369/112.09 |
| 2008/0304394 | A1 * | 12/2008 | Kikuhara et al. ........ | 369/112.16 |
| 2010/0246369 | A1 * | 9/2010 | Sato ......................... | 369/112.23 |

FOREIGN PATENT DOCUMENTS

| | | |
|---|---|---|
| JP | 61-260440 | 11/1986 |
| JP | 64-010448 | 1/1989 |
| JP | 2004-265525 | 9/2004 |
| JP | 2007-72087 | 3/2007 |

* cited by examiner

*Primary Examiner* — Wayne Young
*Assistant Examiner* — Brenda Bernardi
(74) *Attorney, Agent, or Firm* — Cozen O'Connor (57) ABSTRACT

Provided is an optical pickup device which suppresses the decrease of light amount and performs conversion to circular polarization light, wherein the optical pickup device includes a beam splitter and a raising mirror on each of which a layered member is formed, and the optical pickup device satisfies conditional expressions relating to intensities of S-polarized light and P-polarized light with respect to the beam splitter of a laser beam emitted from a semiconductor laser element, reflectances of S-polarized light and P-polarized light on the beam splitter, a reflection phase difference obtained by subtracting a phase of S-polarized light from a phase of P-polarized light after the reflection, reflectances of S-polarized light and P-polarized light on the raising mirror, and a reflection phase difference obtained by subtracting a phase of S-polarized light from a phase of P-polarized light after the reflection.

5 Claims, 5 Drawing Sheets

OPTICAL PICKUP DEVICE

RELATED APPLICATIONS

This is a U.S. National Phase under 35 U.S.C. §371 of International Application No. PCT/JP2010/061447 filed Jul. 6, 2010 and claims priority on Japanese application No. 2009-173856 filed Jul. 27, 2009, the entire content of which is hereby incorporated by reference.

TECHNICAL FIELD

The present invention relates to an optical pickup device which is built into an optical disc apparatus and performs information recording and reproducing for optical discs such as a BD, DVD and CD.

BACKGROUND ART

An optical pickup device is a device for recording (writing) and erasing information in the way that laser light emitted from a semiconductor laser element as a light source is converged with an objective lens onto a signal recording surface of an optical disc, and for reproducing information in the way that reflection light (returning light) coming from the signal recording surface is detected with a photodetector.

Corresponding to the trend of downsizing an optical disc apparatus, there have been proposed techniques of downsizing optical pickup devices from various view points, too. As one of them, Patent Literature 1 discloses a technique that a layered member for controlling a phase difference is arranged on a beam splitter or a raising mirror to eliminate a wavelength plate.

CITATION LIST

Patent Literature

Patent document 1: JP-A No. 2004-265525

SUMMARY OF INVENTION

Technical Problem

However, when information is recorded, it is required to increase the reflectance of the beam splitter and increasing the amount of light going toward an optical disc, because a large amount of light is required. Further, when information is reproduced, it is required to converge circular polarization light onto an optical disc in order to reduce an influence of a birefringence of an optical disc. When the reflectance of the beam splitter is increased, a separation of P-polarization light and S-polarization light in reflection light becomes great. Therefore, it is difficult to bring the P/S ratio of light going toward an optical disc close to 1 in the structure of Patent Literature 1. Accordingly, when reflectance of the beam splitter is increased, the light going toward an optical disc does not become circular polarization light, which does not reach the specifications required to record/reproduce information.

The present invention is aimed to provide an optical pickup device wherein light can be converted into circular polarization light without reducing the light amount as much as possible under the condition that laser light emitted from a semiconductor laser element is separated into P-polarization light and S-polarization light with a beam splitter and a raising mirror.

Solution to Problem

To achieve the above object, the present invention provides an optical pickup device in which laser light emitted from a semiconductor laser element is converged onto a signal recording surface of an optical disc through a polarization optical system, and returning light which returns from the signal recording surface is detected by a photodetector through the polarization optical system. The optical pickup device is characterized in that the semiconductor laser light element is arranged so as to emit light having a predetermined polarization intensity ratio, the polarization optical system includes a beam splitter and a raising mirror on each of which a layered member is formed, where the layered member controls polarized light intensities and a phase difference of the laser light entering thereto to convert the laser light into a circular polarization light, and the optical pickup device satisfies the following expressions, where $E_s$ and $E_p$ are intensities of S-polarized light and P-polarized light of laser light emitted from the semiconductor laser element, with respect to the beam splitter, respectively, $R_{s1}$ and $R_{p1}$ are reflectances (%) of S-polarized light and P-polarized light on the beam splitter, respectively, $\delta_1$ is a reflection phase difference (°) obtained by subtracting a phase of S-polarized light from a phase of P-polarized light after the S-polarized light and the P-polarized light are reflected, $R_{s2}$ and $R_{p2}$ are reflectances (%) of S-polarized light and P-polarized light on the raising mirror, respectively, and $\delta_2$ is a reflection phase difference (°) obtained by subtracting a phase of S-polarized light from a phase of P-polarized light after the S-polarized light and the P-polarized light are reflected:

$E_p > E_s$, $R_{s1} > R_{p1}$, $60 \leq R_{s1} \leq 100$, $0.95 \leq E_s R_{s1} R_{p2} / E_p R_{p1} R_{s2} \leq 1.05$, $90(2n-1) - 10 \leq |\delta_1 - \delta_2| \leq 90(2n-1) + 10$ ($n = 1, 2$).

According to this structure, even when laser light emitted from the semiconductor laser element is separated into P-polarized light and S-polarized light with the beam splitter and the raising mirror, the light can be converted into circular polarization light without reducing the light amount as much as possible.

In the above optical pickup device, the following expression is preferable, in order to prevent the light amount from being reduced as much as possible on the raising mirror:

$R_{p2} \geq 90$ and $R_{s2} \geq 95$.

In the above optical pickup device, the following expression is preferable from the view point that the P/S ratio of light entering the raising mirror is brought to be closer to 1 as much as possible:

$0.95 \leq E_s R_{s1} / E_p R_{p1} \leq 1.05$.

In the above optical pickup device, the following expressions are preferable:

$1.1 R_{p1} \leq R_{s1} \leq 3 R_{p1}$ and $1.1 E_s \leq E_p \leq 3 E_s$.

In the above optical pickup device, as a concrete example of the layered member, there is cited a multilayered dielectric film.

ADVANTAGEOUS EFFECT OF THE INVENTION

According to the present invention, even when laser light emitted from the semiconductor laser element is separated into P-polarized light and S-polarized light with the beam splitter and the raising mirror, the light can be converted into circular polarization light without reducing the light amount as much as possible. As the result, a function of a wavelength plate can be provided with the beam splitter and the raising mirror, and a wavelength plate can be eliminated in the polarization optical system. Accordingly, the number of parts can be reduced, which results in reducing man-hour for an assembling process and in down-sizing of the optical pickup device.

DESCRIPTION OF EMBODIMENTS

Figure 1:
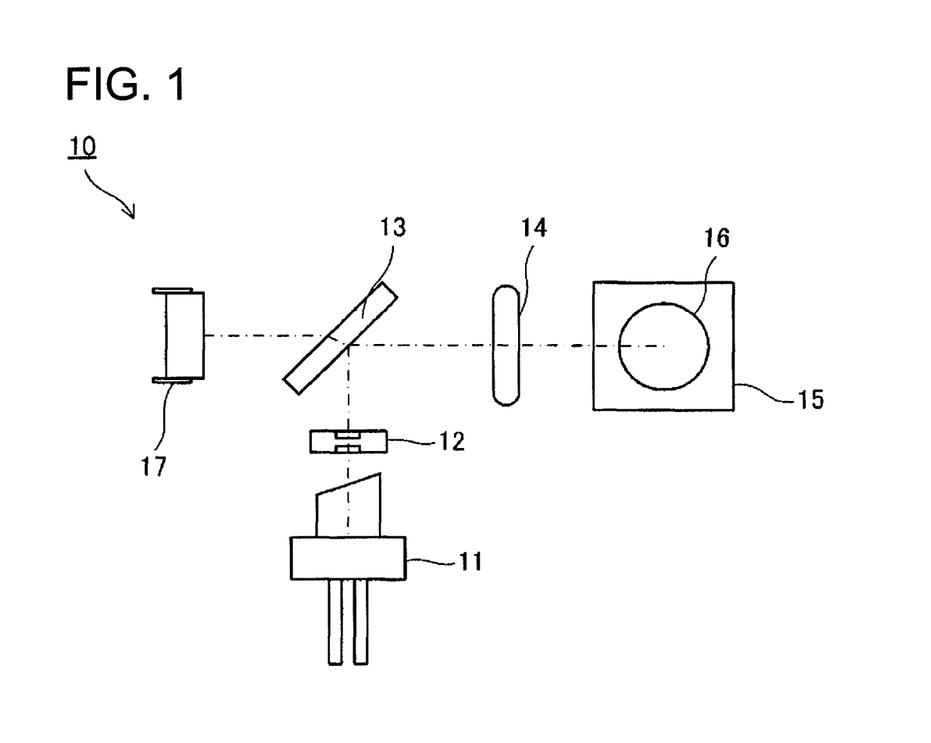
FIG. 1 shows a plane view of a polarization optical system of an optical pickup device of the present invention.
Figure 2:
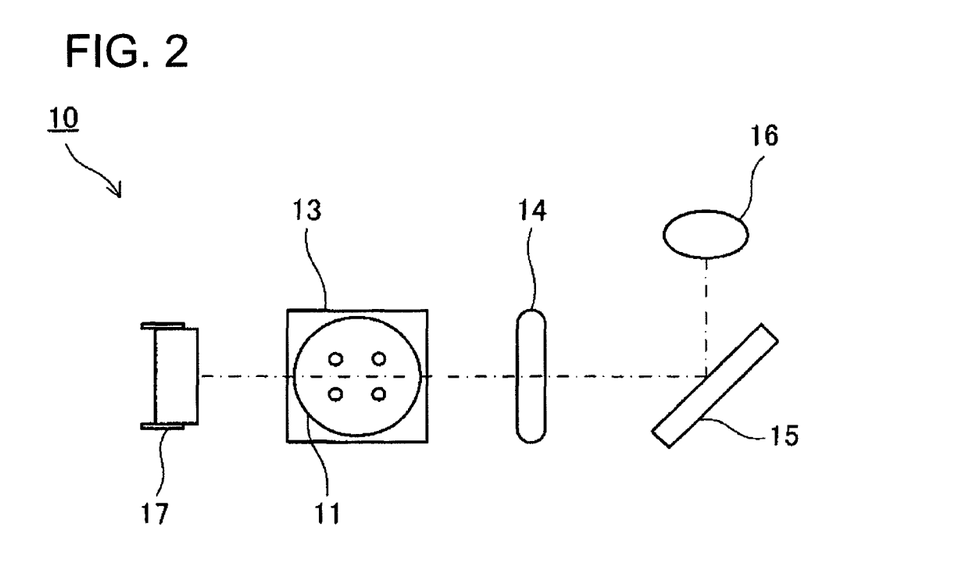
FIG. 2 shows a front view of a polarization optical system of an optical pickup device of the present invention.

FIG. 1 shows a plane view of a polarization optical system of an optical pickup device of the present invention. FIG. 2 shows a front view of a polarization optical system of the optical pickup device of the present invention.

Optical pickup device 10 includes semiconductor laser element (laser diode) 11, diffraction grating 12, beam splitter 13, collimation lens 14, raising mirror 15, objective lens 16 and photodetector 17.

Semiconductor laser element 11 is arranged so as to emit light having a prescribed polarization intensity ratio. Because the polarization intensity ratio affects a design of a layered member which will be described later and the mutual relation is required to be optimized here. Diffraction grating 12 is provided to separate laser light emitted from semiconductor laser element 11 into plural rays of laser light. Beam splitter 13 is provided to reflect the plural rays of laser light traveling from diffraction grating 12 with generating a phase difference (hereinafter, referred as a PS phase difference) between P-polarized light and S-polarized light therein and to transmit returning light (reflection light from an optical disc).

Collimation lens 14 is provided to convert the plural rays of laser light traveling from beam splitter 13 into parallel rays. Raising mirror 15 is provided to generate a PS phase difference in the parallel rays from collimation lens 14, to convert them into circular polarization light and reflect the resulting light so as to bend it at a right angle, and to guide the light toward objective lens 16. Objective lens 16 is provided to converge light reflected by raising mirror 15 onto an optical disc. Herein, the reflection light (returning light) reflected on the optical disc is received by photodetector 17.

Beam splitter 13 and raising mirror 15 are formed in the way that a multilayered dielectric film (formed by layering plural dielectric films) as a layered member (which is not illustrated) is deposited on a reflection surface of a base member such as glass body by using vapor deposition. Thereby, laser light which has entered the multilayered dielectric film and has been reflected or transmitted by the multilayered dielectric film changes in intensities of polarizations and in a phase difference in comparison with the incident light. In the present invention, the beam splitter and raising mirror are designed so as to control the intensities of polarizations and the phase difference to convert the light into circular polarization light. The intensities of polarizations and the phase difference depend on refractive indexes, film thicknesses, a layer structure of the multilayered dielectric film, and the intensities of polarizations and the phase difference can be controlled by selecting suitable combination of them. For example, by layering $SiO_2$ and $TiO_2$ one after the other, and optimizing the respective layer thicknesses and the layering number, the desired intensities of polarizations and phase difference can be obtained.

In optical pickup device 10 having such the structure, laser light emitted from semiconductor laser element 11 is split by diffraction grating 12 into plural rays of laser light. After that, they are reflected by beam splitter 13 in the direction of collimation lens 14 to be bent at a right angle. The rays of laser light reflected by beam splitter 13 are converted into parallel rays with collimation lens 14 and reflected by a reflection surface of raising mirror 15 to be converted into circular polarization light and be bent at a right angle. Then, they are converged (emitted) through objective lens 16 onto a signal recording surface of an optical disc which is driven to rotate. Thereby, information can be written (recorded) or erased for the optical disc.

On the other hand, reflection light (returning light) from the signal recording surface of the optical disc passes objective lens 16 and is reflected by the reflection surface of raising mirror 15, then passes collimation lens 14 and beam splitter 13 and is detected by photodetector 17. Thereby, information which has been written (recorded) in the optical disc can be reproduced.

Herein, conditions for achieving an object of the present invention (to convert laser light emitted from semiconductor laser 11 into circular polarization light without reducing the light amount as much as possible even under the condition that the laser light is split into P-polarized light and S-polarized light with beam splitter 13 and raising mirror 15) are considered.

In the following descriptions, it is denoted that $E_s$ and $E_p$ are the intensities of S-polarized light and P-polarized light of laser light which has been emitted from semiconductor laser element 11, for beam splitter 13, respectively; $R_{s1}$ and $R_{p1}$ are the reflectances (%) of S-polarized light and P-polarized light on beam splitter 13, $\delta_1$ is a reflection phase difference (°) obtained by subtracting a phase of S-polarized light from a phase of P-polarized light after the S-polarized light and P-polarized light are reflected thereon, $R_{s2}$ and $R_{p2}$ are the reflectances (%) of S-polarization light and P-polarization light on raising mirror 15, $\delta_2$ is reflection phase difference (°) obtained by subtracting a phase of S-polarized light from a phase of P-polarized light after the S-polarized light and P-polarized light are reflected thereon.

First, it is required to maintain a high reflectance on beam splitter 13 in order to preventing the light amount on the beam splitter from reducing as much as possible. To achieve that, it is good to make the reflectance of S-polarized light greater than that of P-polarized light. Accordingly, they are defined as $R_{s1} > R_{p1}$ and $60 \leq R_{s1} \leq 100$ in this case. As for the values of $E_s$ and $E_p$, they are defined as $E_p > E_s$, because the intensity ratio of $R_{s1}$ and $R_{p1}$ caused in beam splitter 13 is desired to be reduced as much as possible. To achieve that, it is good to arrange semiconductor laser element 11 with being turned at a predetermined rotation angle on the optical axis.

Further, as a first condition to make light traveling toward the optical disc into circular polarization light, there is provided a condition: $0.95 \leq E_s R_{s1} R_{p2} / E_p R_{p1} R_{s2} \leq 1.05$ in this case, because the value of the P/S ratio (polarization intensity ratio) of light traveling toward the optical disc is required to be about 1. Raising mirror 15 deflects light in a direction which is different from the direction of beam splitter 13 by 90°. Therefore, the polarization components are replaced with each other, $E_s R_{s1} R_{p2}$ represents the intensity of P-polarized light of light traveling toward the optical disc and $E_p R_{p1} R_{s2}$ represents the intensity of S-polarized light toward the optical disc. This numerical range is based on the specifications required of an optical pickup device for reading and writing information for an optical disc. That is, as far as this numerical range is satisfied, no problems are caused in a process of reading and writing information for an optical disc.

As a second condition to make light traveling toward the optical disc into circular polarization light, there is provided a condition: $90(2n-1)-10 \leq |\delta_1 - \delta_2| \leq 90(2n-1)+10$ (n=1, 2) in this case, because the value of the phase difference of S-polarized light and P-polarized light of the light traveling toward the optical disc is required to be about 90°. This numerical range is based on the specifications required of an optical pickup device for reading and writing information for an optical disc, as described above.

When all the above conditions are satisfied, an object of the present invention (to convert laser light emitted by semiconductor laser element 11 with preventing the light amount from reducing as much as possible even under the condition that the laser light is split into P-polarized light and S-polarized light with beam splitter 13 and raising mirror 15) can be achieved.

As the result, a function of a wavelength plate can be provided to beam splitter 13 and raising mirror 15, and a wavelength plate can be eliminated from the polarization optical system. Accordingly, the number of parts can be reduced, which results in reduction of man-hour spent for an assembling process and downsizing of the optical pickup device.

In order to preventing the light amount from reducing as much as possible on raising mirror 15, $R_{p2} \geq 90$ and $R_{s2} \geq 95$ are preferably satisfied. From the view point that the value of the P/S ratio of light entering raising mirror 15 makes close to 1 as much as possible, $0.95 \leq E_s R_{s1} / E_p R p_1 \leq 1.05$ are preferably satisfied.

In order to obtain higher reflectance, it is preferable that the reflectance of S-polarized light is set to be 1.1 times or more of the reflectance of P-polarized light ($R_{s1} \leq 1.1 R_{p1}$). In order to set the value of the intensity ratio of P-polarized light and S-polarized light after the light is reflected by beam splitter 13 to be 1, $E_p \geq 1.1 E_s$ is preferably satisfied to reduce the ratio of reflectance $R_{s1}$ of S-polarized light and reflectance $R_{p1}$ of P-polarized light. On the other hand, when the difference of $R_{s1}$ and $R_{p1}$ is excessively large, the difference of $E_p$ and $E_s$ is required to be large, which reduces the light amount after the light is reflected by beam splitter 13 $(E_s \times R_{s1} + R_p \times R_{p1})^2$ as the result. Therefore, it is preferable that $R_{s1} \leq 3 R_{p1}$ and $E_p \leq 3 E_s$ are satisfied. Accordingly, it is preferable that $1.1 R_{p1} \leq R_{s1} \leq 3 R_{p1}$ and $1.1 E_s \leq E_p \leq 3 E_s$ are satisfied.

Hereinafter, Examples of the above optical pickup device 10 will be described. In the Examples, light with wavelength of 405 nm used for BDs will be considered.

EXAMPLES

Example 1

In Example 1, semiconductor laser element 11 is arranged such that $E_p : E_s = 3:2$ holds. The layered member of beam splitter 13 is formed by layering 19 layers which are, in order from the base material, $SiO_2$ with the thickness of 148.33 nm, $TiO_2$ with the thickness of 86.42 nm, $SiO_2$ with the thickness of 77.07 nm, $TiO_2$ with the thickness of 27.31 nm, $SiO_2$ with the thickness of 35 nm, $TiO_2$ with the thickness of 28.01 nm, $SiO_2$ with the thickness of 229.07 nm, $TiO_2$ with the thickness of 27.88 nm, $SiO_2$ with the thickness of 68.89 nm, $TiO_2$ with the thickness of 20 nm, $SiO_2$ with the thickness of 63.34 nm, $TiO_2$ with the thickness of 20.38 nm, $SiO_2$ with the thickness of 264.77 nm, $TiO_2$ with the thickness of 24.63 nm, $SiO_2$ with the thickness of 129.34 nm, $TiO_2$ with the thickness of 107.69 nm, $SiO_2$ with the thickness of 83.32 nm, $TiO_2$ with the thickness of 61.95 nm, and $SiO_2$ with the thickness of 26.07 nm. Refractive index of $SiO_2$ for light with wavelength of 405 nm is 1.48. Refractive index of $TiO_2$ for light with wavelength of 405 nm is 2.54.

The layered member of raising mirror 15 is formed by layering 24 layers which are, in order from the base material, $TiO_2$ with the thickness of 39.81 nm, $SiO_2$ with the thickness of 75.84 nm, $TiO_2$ with the thickness of 39.92 nm, $SiO_2$ with the thickness of 76.08 nm, $TiO_2$ with the thickness of 40.04 nm, $SiO_2$ with the thickness of 76.53 nm, $TiO_2$ with the thickness of 40.38 nm, $SiO_2$ with the thickness of 77.95 nm, $TiO_2$ with the thickness of 41.59 nm, $SiO_2$ with the thickness of 82.65 nm, $TiO_2$ with the thickness of 45.23 nm, $SiO_2$ with the thickness of 93.72 nm, $TiO_2$ with the thickness of 50.04 nm, $SiO_2$ with the thickness of 99.23 nm, $TiO_2$ with the thickness of 49.48 nm, $SiO_2$ with the thickness of 95.02 nm, $TiO_2$ with the thickness of 49.16 nm, $SiO_2$ with the thickness of 98.42 nm, $TiO_2$ with the thickness of 55.67 nm, $SiO_2$ with the thickness of 105.49 nm, $TiO_2$ with the thickness of 52.42 nm, $SiO_2$ with the thickness of 98.38 nm, $TiO_2$ with the thickness of 62.91 nm, and $SiO_2$ with the thickness of 38.82 nm.

Figure 3:
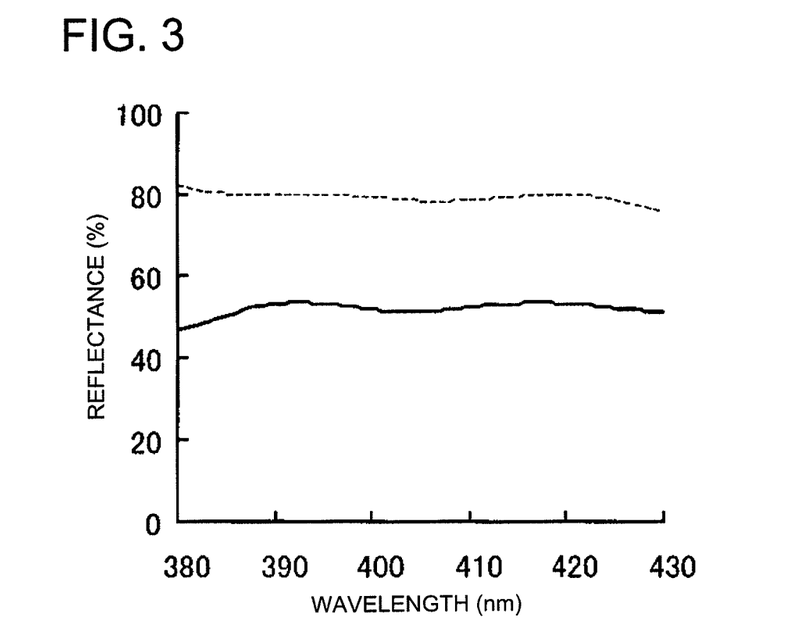
FIG. 3 shows a graph of reflectances of S-polarized light and P-polarized light at 45° on a beam splitter of Example 1 as a function of wavelength.
Figure 4:
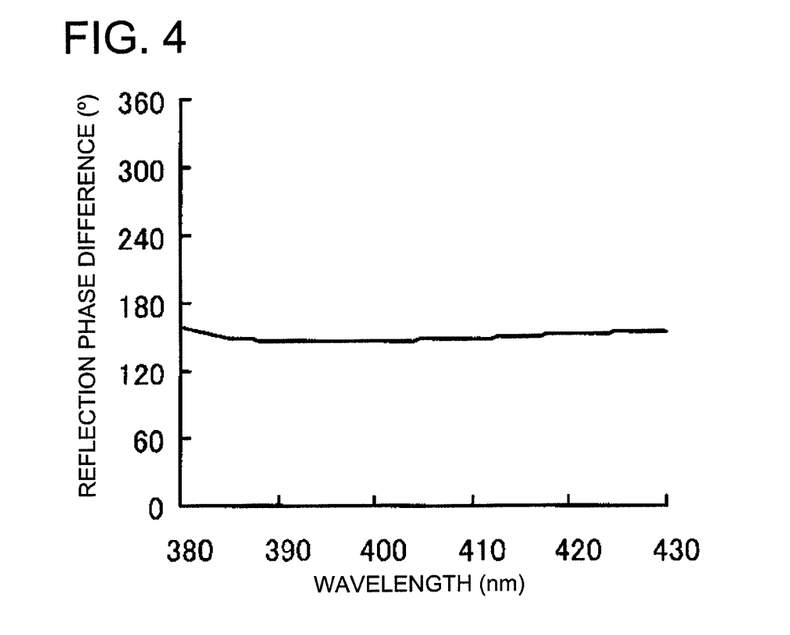
FIG. 4 shows a graph of a reflection phase difference at 45° on a beam splitter of Example 1 as a function of wavelength.

FIG. 3 shows a graph illustrating reflectances at 45° of P-polarized light and S-polarized light on beam splitter 13 as a function of wavelength. FIG. 4 shows a graph illustrating reflection phase difference at 45° on beam splitter 13 as a function of wavelength. In FIG. 3, the reflectance of P-polarization light is represented by a solid line and the reflectance of S-polarization light is represented by a dashed line.

As shown in FIG. 3, the reflectance ($R_{p1}$) of P-polarized light of light with wavelength of 405 nm on beam splitter 13 is about 52% and the reflectance ($R_{s1}$) of S-polarized light of light with wavelength of 405 nm on beam splitter 13 is about 80%. As shown in FIG. 4, reflection phase difference ($\delta_1$) of light with wavelength of 405 nm on beam splitter 13 is about 150°.

Figure 5:
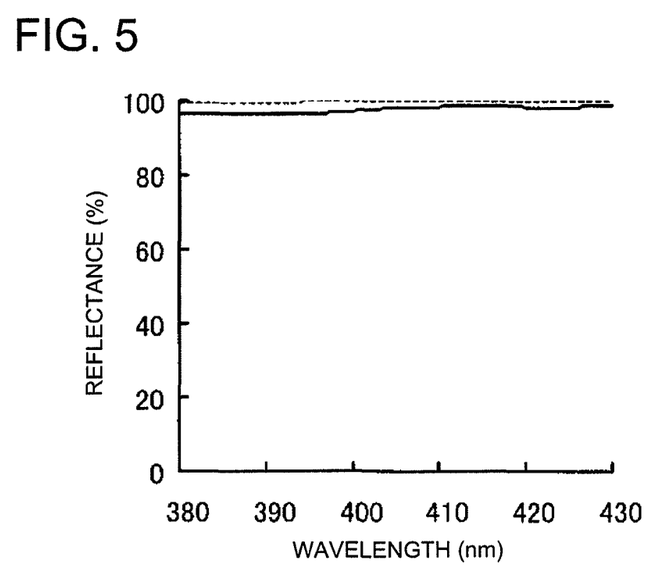
FIG. 5 shows a graph of reflectances of S-polarized light and P-polarized light at 45° on a raising mirror of Example 1 as a function of wavelength.
Figure 6:
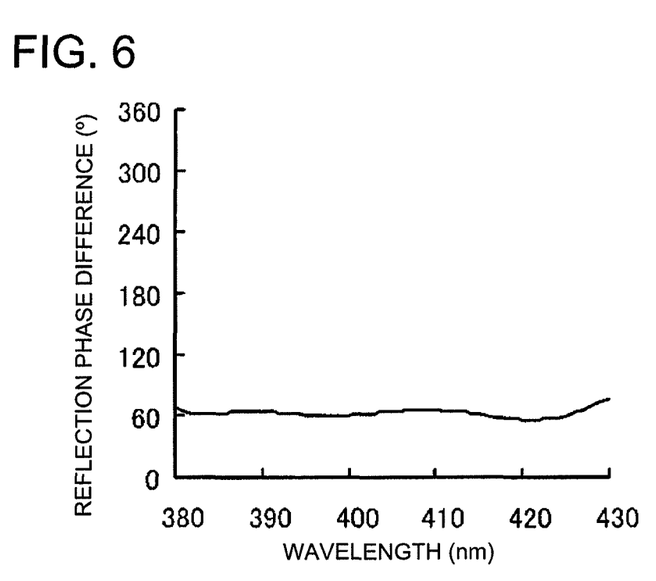
FIG. 6 shows a graph of a reflection phase difference at 45° on a raising mirror of Example 1 as a function of wavelength.

FIG. 5 shows a graph illustrating reflectances at 45° of P-polarized light and S-polarized light on raising mirror 15 as a function of wavelength. FIG. 6 shows a graph illustrating reflection phase difference at 45° on raising mirror 15 as a function of wavelength. In FIG. 5, the reflectance of P-polarized light is represented by a solid line and the reflectance of S-polarized light is represented by a dashed line.

As shown in FIG. 5, the reflectance ($R_{p2}$) of P-polarized light of light with wavelength of 405 nm on raising mirror 15 is about 98% and the reflectance ($R_{s2}$) of S-polarized light of light with wavelength of 405 nm on raising mirror 15 is about 100%. As shown in FIG. 6, reflection phase difference ($\delta_2$) of light with wavelength of 405 nm on raising mirror 15 is about 60°.

Based on the above results, the P/S ratio of light traveling toward the optical disc is given as $E_s R_{s1} R_{p2}/E_p R_{p1} R_{s2}=1.01$, and the phase difference of S-polarized light and P-polarized light of light traveling toward the optical disc is given as $|\delta_1-\delta_2|=90°$. These results are almost equals to P/S=1 and $|\delta_1-\delta_2|=90°$ which are theoretical values for realizing circular polarization light. Therefore, it can be considered that laser light being circular polarization light is emitted to the optical disc. The amount of light traveling toward the optical disc is calculated by $(0.4\times0.8\times0.98)+(0.6\times0.52\times1.00)=0.63$.

Since both of $R_{p2}\leq 90$ and $R_{s2}\leq 95$ are satisfied, it is considered that the light amount is not almost reduced on raising mirror 15. Since $0.95\leq E_s R_{s1}/E_p R_{p1}\leq 1.05$ is satisfied, it is considered that the P/S ratio of light entering raising mirror 15 is close to 1.

Since both of $1.1 R_{p1}\leq R_{s1}\leq 3 R_{p1}$ and $1.1 E_s\leq E_p\leq 3 E_s$ are satisfied, the loss of light amount after the light is reflected by beam splitter 13 is kept to be minimum.

Example 2

In Example 2, semiconductor laser element 11 is arranged such that $E_p:E_s=1.27:1$ holds. The layered member of beam splitter 13 is formed by layering 17 layers which are, in order from the base material, $SiO_2$ with the thickness of 148.18 nm, $TiO_2$ with the thickness of 83.22 nm, $SiO_2$ with the thickness of 92.6 nm, $TiO_2$ with the thickness of 23.04 nm, $SiO_2$ with the thickness of 35 nm, $TiO_2$ with the thickness of 27.08 nm, $SiO_2$ with the thickness of 228.24 nm, $TiO_2$ with the thickness of 30.82 nm, $SiO_2$ with the thickness of 40.99 nm, $TiO_2$ with the thickness of 22.35 nm, $SiO_2$ with the thickness of 383.56 nm, $TiO_2$ with the thickness of 35.12 nm, $SiO_2$ with the thickness of 100.41 nm, $TiO_2$ with the thickness of 113.12 nm, $SiO_2$ with the thickness of 103.16 nm, $TiO_2$ with the thickness of 47.99 nm, and $SiO_2$ with the thickness of 46.76 nm.

The layered member of raising mirror 15 is formed by layering 28 layers which are, in order from the base material, $TiO_2$ with the thickness of 42.97 nm, $SiO_2$ with the thickness of 64.93 nm, $TiO_2$ with the thickness of 33.22 nm, $SiO_2$ with the thickness of 25.11 nm, $TiO_2$ with the thickness of 43.16 nm, $SiO_2$ with the thickness of 67.75 nm, $TiO_2$ with the thickness of 132.82 nm, $SiO_2$ with the thickness of 74.39 nm, $TiO_2$ with the thickness of 45.12 nm, $SiO_2$ with the thickness of 77.4 nm, $TiO_2$ with the thickness of 45.58 nm, $SiO_2$ with the thickness of 82.02 nm, $TiO_2$ with the thickness of 46.5 nm, $SiO_2$ with the thickness of 88.49 nm, $TiO_2$ with the thickness of 46.7 nm, $SiO_2$ with the thickness of 93.19 nm, $TiO_2$ with the thickness of 46.97 nm, $SiO_2$ with the thickness of 96.65 nm, $TiO_2$ with the thickness of 48.41 nm, $SiO_2$ with the thickness of 100.83 nm, $TiO_2$ with the thickness of 51.59 nm, $SiO_2$ with the thickness of 104.6 nm, $TiO_2$ with the thickness of 51.31 nm, $SiO_2$ with the thickness of 95 nm, $TiO_2$ with the thickness of 57.68 nm, $SiO_2$ with the thickness of 117.81 nm, $TiO_2$ with the thickness of 48.52 nm, and $SiO_2$ with the thickness of 215.34 nm.

Figure 7:
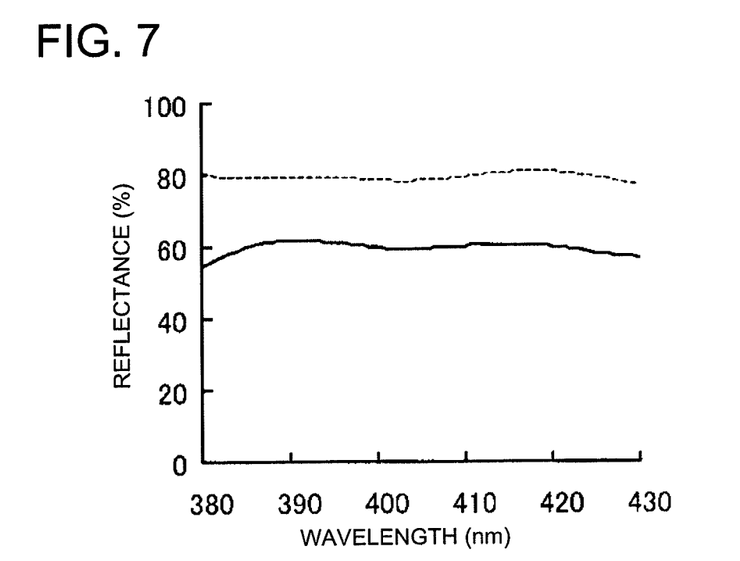
FIG. 7 shows a graph of reflectances of S-polarized light and P-polarized light at 45° on a beam splitter of Example 2 as a function of wavelength.
Figure 8:
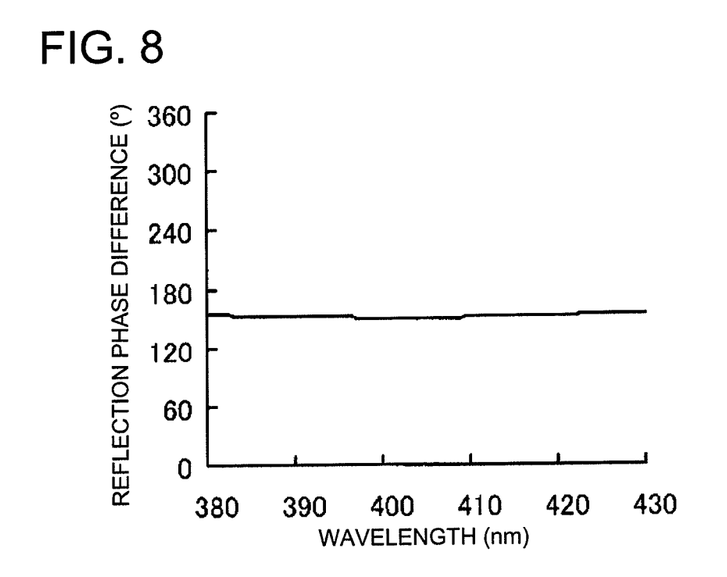
FIG. 8 shows a graph of a reflection phase difference at 45° for wavelength on a beam splitter of Example 2 as a function of wavelength.

FIG. 7 shows a graph illustrating reflectances at 45° of P-polarized light and S-polarized light on beam splitter 13 as a function of wavelength. FIG. 8 shows a graph illustrating reflection phase difference at 45° on beam splitter 13 as a function of wavelength. In FIG. 7, the reflectance of P-polarized light is represented by a solid line and the reflectance of S-polarized light is represented by a dashed line.

As shown in FIG. 7, the reflectance ($R_{p1}$) of P-polarized light of light with wavelength of 405 nm on beam splitter 13 is about 60% and the reflectance ($R_{s1}$) of S-polarized light of light with wavelength of 405 nm on beam splitter 13 is about 80%. As shown in FIG. 8, reflection phase difference ($\delta_1$) of light with wavelength of 405 nm on beam splitter 13 is about 150°.

Figure 9:
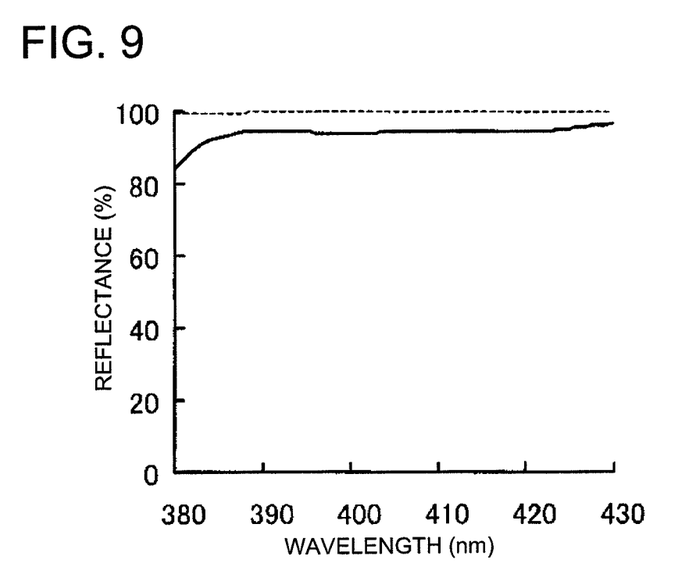
FIG. 9 shows a graph of reflectances of S-polarized light and P-polarized light at 45° on a raising mirror of Example 2 as a function of wavelength.
Figure 10:
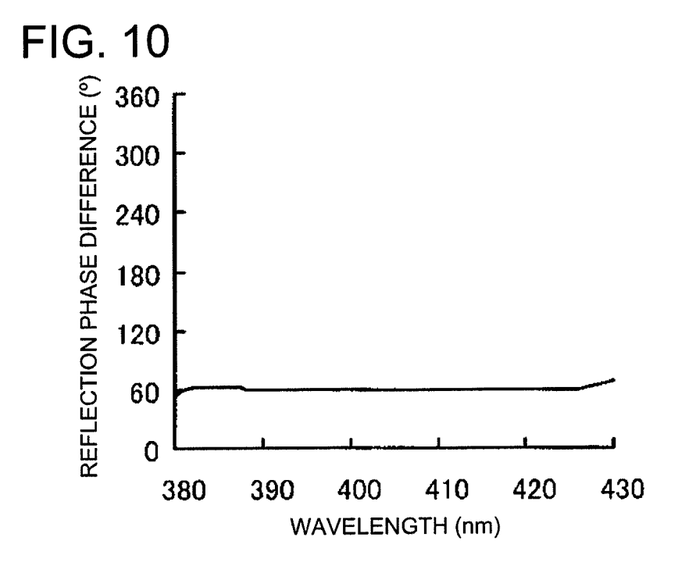
FIG. 10 shows a graph of a reflection phase difference at 45° on a raising mirror of Example 2 as a function of wavelength.

FIG. 9 shows a graph illustrating reflectances at 45° of P-polarized light and S-polarized light on raising mirror 15 as a function of wavelength. FIG. 10 shows a graph illustrating reflection phase difference at 45° on raising mirror 15 as a function of wavelength. In FIG. 9, the reflectance of P-polarized light is represented by a solid line and the reflectance of S-polarized light is represented by a dashed line.

As shown in FIG. 9, the reflectance ($R_{p2}$) of P-polarized light of light with wavelength of 405 nm on raising mirror 15 is about 94% and the reflectance ($R_{s2}$) of S-polarized light of light with wavelength of 405 nm on raising mirror 15 is about 100%. As shown in FIG. 10, reflection phase difference ($\delta_2$) of light with wavelength of 405 nm on raising mirror 15 is about 60°.

Based on the above results, the P/S ratio of light traveling toward the optical disc is given as $E_s R_{s1} R_{p2}/E_p R_{p1} R_{s2}=0.99$, and the phase difference of S-polarized light and P-polarized light of light traveling toward the optical disc is given as $|\delta_1-\delta_2|=90°$. These results are almost equals to P/S=1 and $|\delta_1-\delta_2|=90°$ which are theoretical values for realizing circular polarization light. Therefore, it can be considered that laser light being circular polarization light is emitted to the optical disc. The amount of light traveling toward the optical disc is calculated by $(0.44\times0.8\times0.94)+(0.56\times0.6\times1.00)=0.67$.

Since both of $R_{p2}\leq 90$ and $R_{s2}\leq 95$ are satisfied, it is considered that the light amount is not almost reduced on raising mirror 15. Since $0.95\leq E_s R_{s1}/E_p R_{p1}\leq 1.05$ is satisfied, it is considered that the P/S ratio of light entering raising mirror 15 is close to 1.

Since both of $1.1 R_{p1}\leq R_{s1}\leq 3 R_{p1}$ and $1.1 E_s\leq E_p\leq 3 E_s$ are satisfied, the loss of light amount after the light is reflected by beam splitter 13 is kept to be minimum.

The scope of the present invention is not limited to the above Examples. For example, in the above examples provide optical pickup devices handling BDs, but it may be a device handling DVDs or CDs. Further, it may be a device handling two kinds or three kinds of optical discs among BDs, DVDs and CDs.

As a multilayered dielectric film, for example, a material such as $MgF_2$ and $Al_2O_3$ can be used in place of $SiO_2$, and a compound provided by mixing a material such as $Nb_2O_3$, $Ta_2O_5$, $La_2O_3$, $TiO_2$ can be used in place of $TiO_2$.

Industrial Applicability

The optical pickup device of the present invention can be used for recoding and reproducing information for optical discs such as BDs, DVDs and CDs.

REFERENCE SIGNS LIST

10 Optical pickup device
11 Semiconductor laser element
12 Diffraction grating
13 Beam splitter
14 Collimation lens

15 Raising mirror
16 Objective lens
17 Photodetector

The invention claimed is:

1. An optical pickup device comprising:
a semiconductor laser element for emitting a laser light;
a polarization optical system for converging, the laser light emitted from the semiconductor laser element onto a signal recording surface of an optical disc; and
a photodetector for detecting returning light which returns from the signal recording surface through the polarization optical system,
wherein the semiconductor laser light element is arranged so as to emit light having a predetermined polarization intensity ratio,
the polarization optical system includes a beam splitter and a raising mirror on each of which a layered member is formed, where the layered member controls polarized light intensities and a phase difference of the laser light entering thereto to convert the laser light into a circular polarized light, and
the optical pickup device satisfies the following expressions:

$Ep > Es$, $Rs1 > Rp1$, $60 \leq Rs1 \leq 100$, $0.95 \leq EsRs1Rp2/EpRp1Rs2 \leq 1.05$, $90(2n-1)-10 \leq |\delta1-\delta2| \leq 90(2n-1)+10 (n=1,2)$, where Es and Ep are intensities of S-polarized light and P-polarized light of laser light emitted from the semiconductor laser element, with respect to the beam splitter, respectively,
Rs1 and Rp1 are reflectances (%) of S-polarized light and P-polarized light on the beam splitter, respectively,
$\delta1$ is a reflection phase difference)(°) obtained by subtracting a phase of S-polarized light from a phase of P-polarized light after the S-polarized light and the P-polarized light are reflected on the beam splitter,
Rs2 and Rp2 are reflectances (%) of S-polarized light and P-polarized light on the raising mirror, respectively, and
$\delta2$ is a reflection phase difference (°) obtained by subtracting a phase of S-polarized light from a phase of P-polarized light after the S-polarized light and the P-polarized light are reflected on the raising mirror.

2. The optical pickup device of claim 1, satisfying $Rp2 \geq 90$ and $Rs2 \geq 95$.

3. The optical pickup device of claim 2, satisfying $0.95 \leq EsRs1/EpRp1 \leq 1.05$.

4. The optical pickup device of claim 1, satisfying $1.1Rp1 \leq Rs1 \leq 3Rp1$ and $1.1Es \leq Ep \leq 3Es$.

5. The optical pickup device of claim 1, wherein the layered member is a multilayered dielectric film.

* * * * *